United States Patent
Melas et al.

(10) Patent No.: US 9,561,806 B2
(45) Date of Patent: Feb. 7, 2017

(54) VISIBILITY CONTROL SYSTEM AND METHOD FOR LOCOMOTIVE

(71) Applicant: Electro-Motive Diesel, Inc., LaGrange, IL (US)

(72) Inventors: Dennis Melas, Chicago, IL (US); Isaac Traylor, Brookfield, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 0 days.

(21) Appl. No.: 14/630,935

(22) Filed: Feb. 25, 2015

(65) Prior Publication Data

US 2016/0244025 A1 Aug. 25, 2016

(51) Int. Cl.
- *B60S 1/08* (2006.01)
- *B61D 25/00* (2006.01)
- *B60S 1/02* (2006.01)
- *B60S 1/48* (2006.01)

(52) U.S. Cl.
CPC .............. *B61D 25/00* (2013.01); *B60S 1/023* (2013.01); *B60S 1/0818* (2013.01); *B60S 1/485* (2013.01)

(58) Field of Classification Search
USPC .......... 318/DIG. 2, 643; 701/36, 31.4, 70, 8; 15/250.02, DIG. 15, 250.001
See application file for complete search history.

(56) References Cited

U.S. PATENT DOCUMENTS

| | | | | | |
|---|---|---|---|---|---|
| 4,393,341 | A | * | 7/1983 | Byrne | B60S 1/482 15/250.02 |
| 4,554,493 | A | * | 11/1985 | Armstrong | B60S 1/0822 318/444 |
| 4,595,866 | A | * | 6/1986 | Fukatsu | B60S 1/485 15/DIG. 15 |
| 5,015,931 | A | * | 5/1991 | Muller | B60S 1/485 318/443 |
| 5,027,001 | A | * | 6/1991 | Torbert | B60Q 1/143 307/10.1 |
| 5,498,866 | A | * | 3/1996 | Bendicks | B60S 1/0822 250/227.25 |
| 5,729,105 | A | * | 3/1998 | Droge | B60S 1/0818 15/DIG. 15 |
| 5,791,407 | A | * | 8/1998 | Hammons | B60H 1/2221 123/142.5 E |
| 5,923,027 | A | * | 7/1999 | Stam | B60S 1/0822 15/DIG. 15 |

(Continued)

*Primary Examiner* — Thomas Tarcza
*Assistant Examiner* — Richard Goldman
(74) *Attorney, Agent, or Firm* — Fahlberg Law (57) ABSTRACT

A vision control system for controlling a vision of a glass surface of a locomotive. The vision control system includes a sensing module for detecting at least one parameter related to the glass surface. The sensing module includes a moisture sensing device configured to detect a presence of moisture on the glass surface and a photo sensor configured to detect an opacity of the glass surface. The vision control system also includes a cleaning system configured to perform a cleaning operation on the glass surface. The vision control system further includes a controller communicably coupled to the sensing module and the cleaning system. The controller is configured to receive a signal indicative of the at least one parameter related to the glass surface from the sensing module and communicate with the cleaning system to control the cleaning operation based on the received signal.

14 Claims, 8 Drawing Sheets

(56) References Cited

U.S. PATENT DOCUMENTS

| | | | | |
|---|---|---|---|---|
| 6,020,704 A * | 2/2000 | Buschur | B60S 1/0822 | 15/250.12 |
| 6,084,519 A | 7/2000 | Coulling et al. | | |
| 6,160,369 A * | 12/2000 | Chen | B60S 1/0822 | 15/250.12 |
| 6,207,967 B1 * | 3/2001 | Hochstein | B60S 1/0822 | 250/208.1 |
| 6,236,180 B1 * | 5/2001 | Contos | B60S 1/485 | 15/250.02 |
| 6,313,457 B1 * | 11/2001 | Bauer | G01J 1/46 | 250/214 C |
| 6,353,392 B1 * | 3/2002 | Schofield | B60H 1/00785 | 318/444 |
| 6,555,804 B1 * | 4/2003 | Blasing | B60S 1/0822 | 250/208.1 |
| 6,615,438 B1 * | 9/2003 | Franco | B60S 1/482 | 15/250.01 |
| 6,657,410 B1 * | 12/2003 | Berger | B60S 1/0818 | 15/250.12 |
| 6,681,163 B2 * | 1/2004 | Stam | B60Q 1/143 | 250/208.1 |
| 6,745,582 B1 * | 6/2004 | Urbank | B60H 1/00735 | 236/51 |
| 6,765,631 B2 * | 7/2004 | Ishikawa | B60S 1/0818 | 318/445 |
| 6,802,205 B2 * | 10/2004 | Barguirdjian | B32B 17/10036 | 318/443 |
| 7,002,480 B2 * | 2/2006 | Kobayashi | B60S 1/0822 | 250/208.1 |
| 7,345,445 B2 * | 3/2008 | Huntzicker | B60S 1/0818 | 15/250.12 |
| 7,385,216 B2 * | 6/2008 | Yoshigoe | B60S 1/0822 | 250/227.25 |
| 7,424,765 B1 * | 9/2008 | Stevens | B60S 1/28 | 15/250.29 |
| 7,528,500 B2 * | 5/2009 | Kwon | B60S 1/08 | 15/250.001 |
| 7,616,781 B2 * | 11/2009 | Schofield | G06K 9/00818 | 382/104 |
| 7,772,794 B2 * | 8/2010 | Kokuryo | B60S 1/0822 | 250/208.1 |
| 7,797,785 B2 * | 9/2010 | Thibodeau | B60S 1/46 | 15/250.02 |
| 8,265,824 B2 * | 9/2012 | Oishi | B60S 1/0818 | 318/483 |
| 8,983,705 B2 * | 3/2015 | Zhu | G01W 1/00 | 701/23 |
| 2003/0069674 A1 * | 4/2003 | Stam | B60Q 1/143 | 701/36 |
| 2004/0144911 A1 * | 7/2004 | Stam | B60Q 1/143 | 250/208.1 |
| 2006/0004494 A1 * | 1/2006 | Errington | B60H 1/00785 | 701/1 |
| 2008/0212101 A1 * | 9/2008 | Wolf | B32B 17/10036 | 356/445 |
| 2009/0134830 A1 * | 5/2009 | Kokuryo | B60S 1/0818 | 318/483 |
| 2011/0054794 A1 * | 3/2011 | Teder | G01N 21/552 | 702/3 |
| 2013/0327356 A1 * | 12/2013 | Caillot | B60S 1/08 | 134/6 |
| 2015/0066293 A1 * | 3/2015 | Davies | B60S 1/0862 | 701/36 |
| 2015/0120093 A1 * | 4/2015 | Renn | G01N 21/3554 | 701/3 |

* cited by examiner

VISIBILITY CONTROL SYSTEM AND METHOD FOR LOCOMOTIVE

TECHNICAL FIELD

The present disclosure relates to a visibility control system for a windshield, and more specifically to the visibility control system for the windshield of a locomotive.

BACKGROUND

Typically, machines such as locomotives include one or more windshields disposed in a cabin to facilitate viewing of tracks and other surroundings of the locomotive. In some cases, an unattended locomotive may include a monitoring device such as a camera disposed in the cabin. The camera may provide data related to the surroundings of the locomotive such as tracks etc. as seen through the windshields. In some cases due to various environment or operational conditions, moisture or fog may be present on one or more of the windshields. Presence of moisture, fog or other particulate matter may affect the visibility through the windshields for the operator and/or the camera.

Conventionally, the machines may include windshield wipers or other cleaning devices to improve visibility through the windshield. These devices are typically activated after a certain time interval or by an operator. However, manual activation of these devices may not be possible in case of unattended locomotives. Further, these methods may not be efficient and accurate.

U.S. Pat. No. 7,345,445 describes a wiping system for use on a vehicle window. The wiping system includes a window wiper assembly positioned proximate the window, a first sensor for detecting the presence of moisture on the window and a second sensor for detecting if the vehicle has been remotely started. A controller is coupled to the wiper assembly and to the first and second sensors and enables the wiper assembly when the vehicle has been remotely started and moisture is present on the window. The wiping system also comprises a third sensor for detecting the presence of moisture on the window, a fourth sensor for detecting vehicle shut-down, and a fifth sensor for sensing the temperature of the window. The controller is coupled to each of the third, fourth, and fifth sensors and enables the wiper assembly when the vehicle has been shut-down for less than a predetermined period of time, the temperature of the window exceeds a temperature threshold, and moisture is detected on the window.

SUMMARY OF THE DISCLOSURE

In one aspect of the present disclosure, a visibility control system for controlling visibility through a glass surface of a locomotive. The visibility control system includes a sensing module for detecting at least one parameter related to the glass surface. The sensing module includes a moisture sensing device configured to detect a presence of moisture on the glass surface and a photo sensor configured to detect opacity of the glass surface. The visibility control system also includes a cleaning system configured to perform a cleaning operation on the glass surface. The visibility control system further includes a controller communicably coupled to the sensing module and the cleaning system. The controller is configured to receive a signal indicative of the at least one parameter related to the glass surface from the sensing module and communicate with the cleaning system to control the cleaning operation based on the received signal.

In another aspect of the present disclosure, a visibility control system for controlling visibility through a glass surface of a locomotive is provided. The visibility control system includes a sensing module for detecting at least one parameter related to the glass surface. The sensing module includes a moisture sensing device configured to detect a presence of moisture on the glass surface and a photo sensor configured to detect opacity of the glass surface. The sensing module also includes a cleaning system configured to perform a cleaning operation on the glass surface and a user input interface disposed external to the locomotive. The visibility control system further includes a controller communicably coupled to the sensing module, the cleaning system and the user input interface. The controller is configured to receive, via the sensing module, a signal indicative of the at least one parameters related to the glass surface, receive, via the user input interface, a user input corresponding to controlling the cleaning operation. The controller is further configured to communicate with the cleaning system to control the cleaning operation based on at least one of the received user input and the received signal.

In yet another aspect of the present disclosure, a method of controlling visibility through a glass surface of a locomotive is provided. The method includes detecting at least one parameter of the glass surface. The parameters include opacity of the glass surface, a presence of moisture on the glass surface and a presence of fog on the glass surface. The method also includes activating a wiper assembly upon detecting the presence of the moisture. The wiper assembly is configured to at least partly remove the moisture from the glass surface. The method further includes activating a defogger system upon detecting the presence of fog. The defogger system is configured to at least partly remove the fog from the glass surface. The method also includes activating a washer fluid system upon determining the opacity is less than a threshold opacity. The washer fluid system is configured to apply a washer fluid to the glass surface.

Other features and aspects of this disclosure will be apparent from the following description and the accompanying drawings.

DETAILED DESCRIPTION

Figure 1:
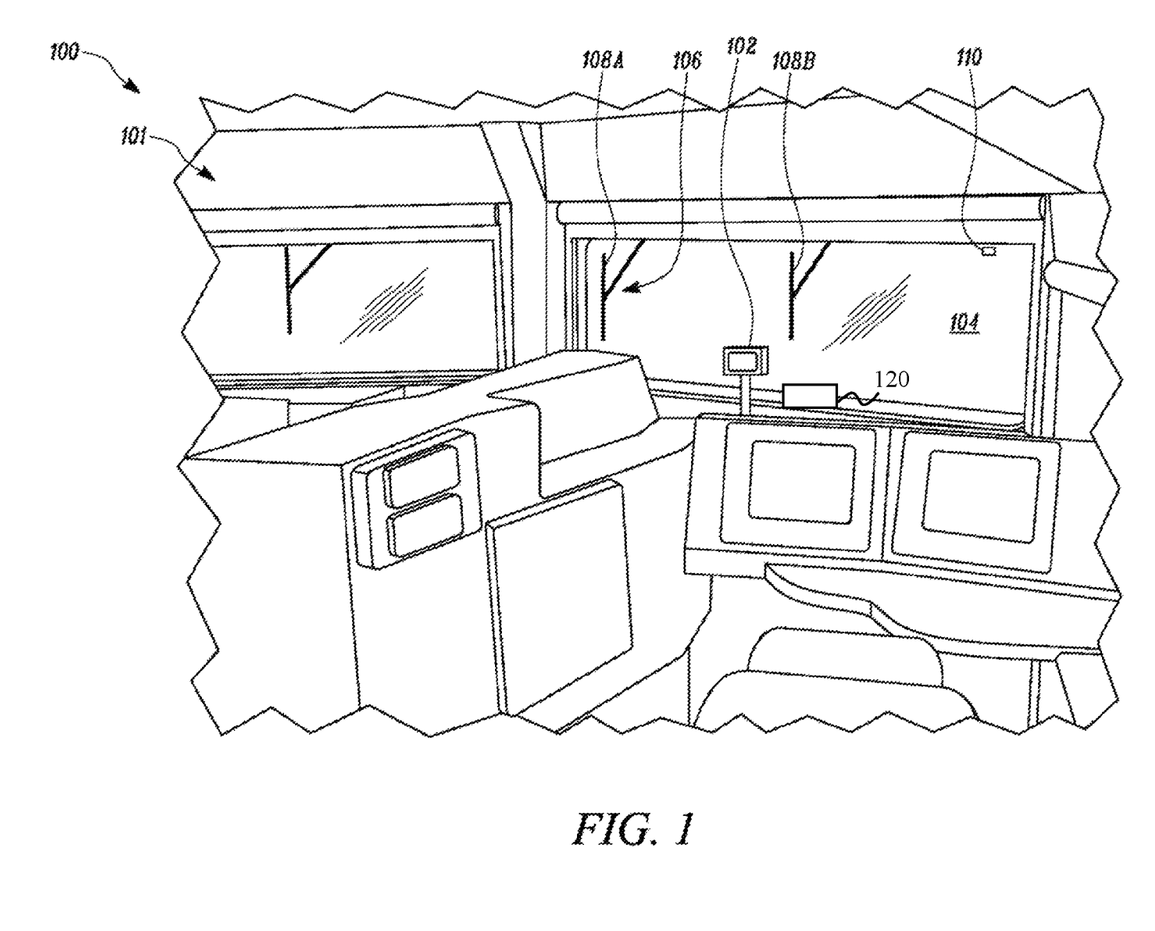
FIG. 1 is a partial perspective view of a cabin of an exemplary locomotive, according to an embodiment of the present disclosure.

Wherever possible, the same reference numbers will be used throughout the drawings to refer to the same or similar parts. Referring to FIG. 1, a perspective view of a cabin 101 of an exemplary locomotive 100 is illustrated. In various examples, the locomotive 100 may be associated with an industry including, but not limited to, transportation, construction, agriculture, forestry, material handling, and waste management.

The locomotive 100 may generally include a frame (not shown) configured to support one or more components of the locomotive 100. The locomotive 100 may include a set of wheels (not shown) rotatably coupled to the frame. The set of wheels are configured to provide mobility to the locomotive 100 on a set of rails or tracks (not shown). The locomotive 100 may include a power system (not shown) configured to provide power to the locomotive 100 for mobility and other operational requirements. The power system may provide power for driving the wheels to move the locomotive 100 along the pair of tracks or rails. In an example, the power system may include an internal combustion engine powered by a fuel, such as, gasoline, diesel, natural gas, and any other fuel known in the art.

The cabin 101 may be provided on the frame. The cabin 101 may include various controls, and input devices that may be used to control various components of the locomotive 100. Referring to FIG. 1, an interior of the cabin 101 is illustrated. The cabin 101 may include one or more glass surfaces 104 that may allow an operator in the locomotive 100 to see a route along the track, for example. In one example, the glass surface 104 may be a windshield.

A person of ordinary skill in the art will recognize that the locomotive 100 may include other components such as a plurality of car bodies and the like based on a type of application. In some embodiments, the locomotive 100 may refer to a collection of two or more locomotives that are connected to each other to form a locomotive consist. In some embodiments, a back end of the locomotive 100 may be attached or coupled to move a series of cars.

In an embodiment, the locomotive 100 includes a monitoring device 102 disposed in the cabin 101. In an example, the monitoring device 102 may be camera. In another example, the monitoring device 102 may be a video recorder. The monitoring device 102 may be configured to record data related to a surrounding of the locomotive 100. In an example, the monitoring device 102 may be positioned behind the glass surface 104 to record the data as seen through the glass surface 104.

Figure 2:
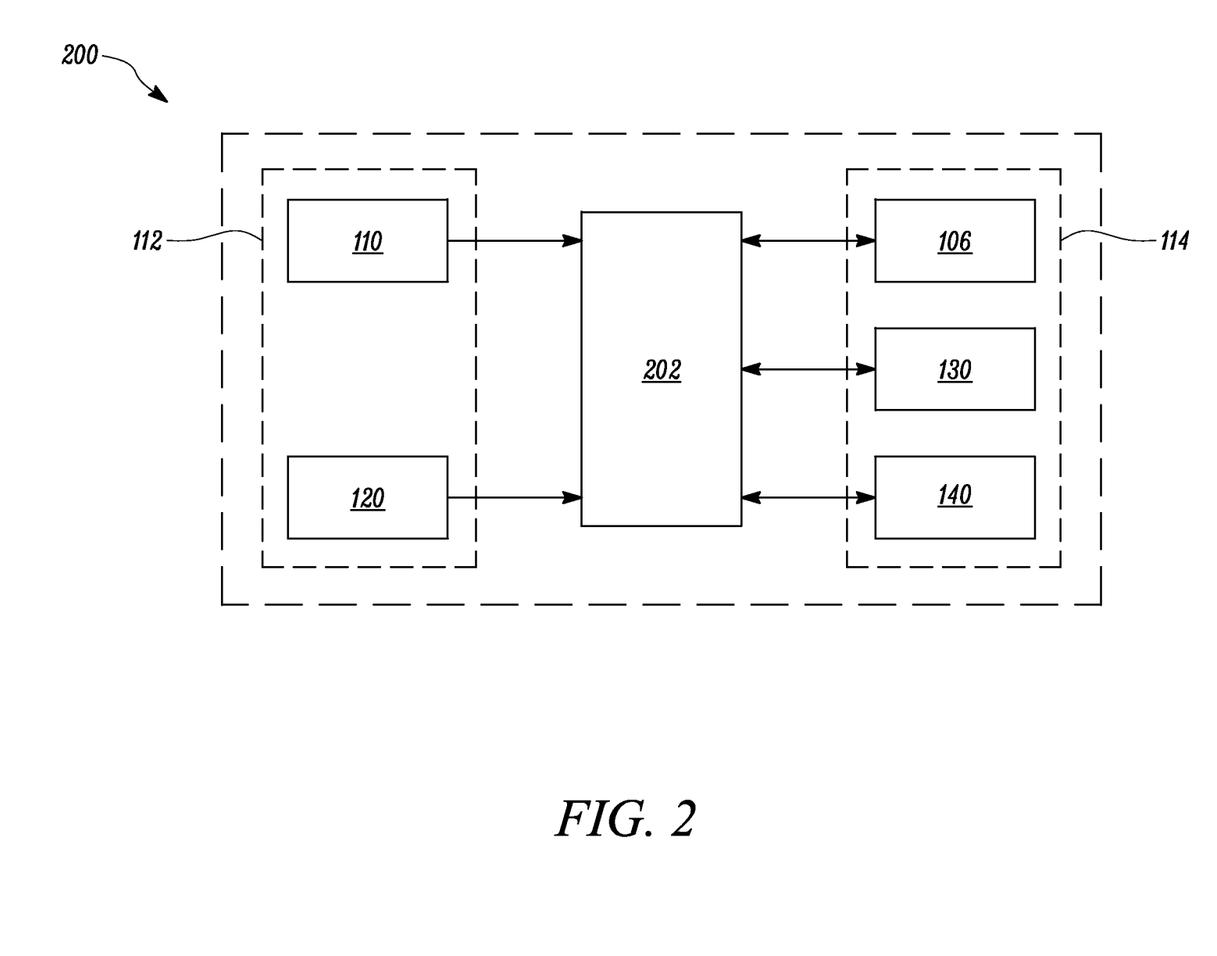
FIG. 2 is a block diagram of a visibility control system for a glass surface of the cabin, according to an embodiment of the present disclosure.

Referring to FIG. 2, the locomotive 100 includes a visibility control system 200 for controlling visibility through the glass surface 104, according to an embodiment of the present disclosure. The glass surface 104 is embodied as a windshield of the locomotive 100. The visibility control system 200 includes a sensing module 112 for detecting at least one parameter related to the glass surface 104. The sensing module 112 includes a moisture sensing device 110 disposed on the glass surface 104. Further, the moisture sensing device 110 is configured to detect a presence of moisture on an exterior (not shown) of the glass surface 104. The moisture sensing device 110 may embody any moisture sensor commonly known in the art. In an embodiment, the moisture sensing device 110 may also be configured to detect a presence of fog on an interior of the glass surface 104. Alternatively, the sensing module 112 may include another sensor disposed on the glass surface 104 for detecting the presence of fog on the interior of the glass surface 104.

The sensing module 112 also includes a photo sensor 120 configured to detect an opacity of the glass surface 104. The photo sensor 120 may embody any sensor commonly known in the art that is configured to determine the opacity. In various embodiments, the sensing module 112 may include other sensors, for example a temperature sensor to detect other parameters related to the glass surface 104.

The visibility control system 200 further includes a cleaning system 114 configured to perform a cleaning operation on the glass surface 104. In an embodiment, the cleaning system 114 may include a wiper assembly 106 configured to at least partly remove the moisture on the glass surface 104. The wiper assembly 106 may include one or more wiper members (wiper member 108A, 108B shown in FIG. 1) that are movably coupled to the exterior of the glass surface 104. Further, the wiper members 108A, 108B may be configured to move across the glass surface 104 to at least partly remove the moisture from the glass surface 104 upon activating the wiper assembly 106.

The cleaning system 114 may also include a defogger system 130 configured to at least partly remove the fog on the glass surface 104. In an example, the defogger system 130 includes a heating element (not shown) disposed proximate to the glass surface 104 for heating air. Further, the defogger system 130 may also include a blower (not shown) for blowing the heated air against the glass surface 104.

The cleaning system 114 may further include a washer fluid system 140. The washer fluid system 140 may embody any system configured to apply a washer fluid to the glass surface 104. The washer fluid may be water, or a mixture of water with cleaning agents or other types of washer fluids known in the art. In an example, the washer fluid system 140 may include a container defining a port. One or more pipes may be disposed in the port. Further, the container may receive the washer fluid from a reservoir and deliver the washer fluid to the glass surface 104 through the pipes.

A position and structural configuration of various components of the cleaning system 114 is merely exemplary in nature and hence non-limiting to this disclosure. Moreover, the components of the cleaning system 114 may embody other types of devices known in the art and configured to function according to various embodiments of the present disclosure.

The visibility control system 200 further includes a controller 202 communicably coupled to the sensing module 112 and the cleaning system 114. The controller 202 may be an electronic controller that operates in a logical fashion to perform operations, execute control algorithms, store and retrieve data and other desired operations. The controller 202 may include or access memory, secondary storage devices, processors, and any other components for running an application. The memory and secondary storage devices may be in the form of read-only memory (ROM) or random access memory (RAM) or integrated circuitry that is accessible by the controller 202. Various other circuits may be associated with the controller 202 such as power supply circuitry, signal conditioning circuitry, driver circuitry, and other types of circuitry.

The controller 202 may be a single controller or may include more than one controller disposed to control various functions and/or features of the visibility control system 200 and/or the locomotive 100. The term "controller 202" is meant to be used in its broadest sense to include one or more controllers and/or microprocessors that may be associated with the locomotive 100 and that may cooperate in controlling various functions and operations of the visibility control system 200 and/or the locomotive 100. The functionality of the controller 202 may be implemented in hardware and/or software without regard to the functionality employed.

Figure 3:
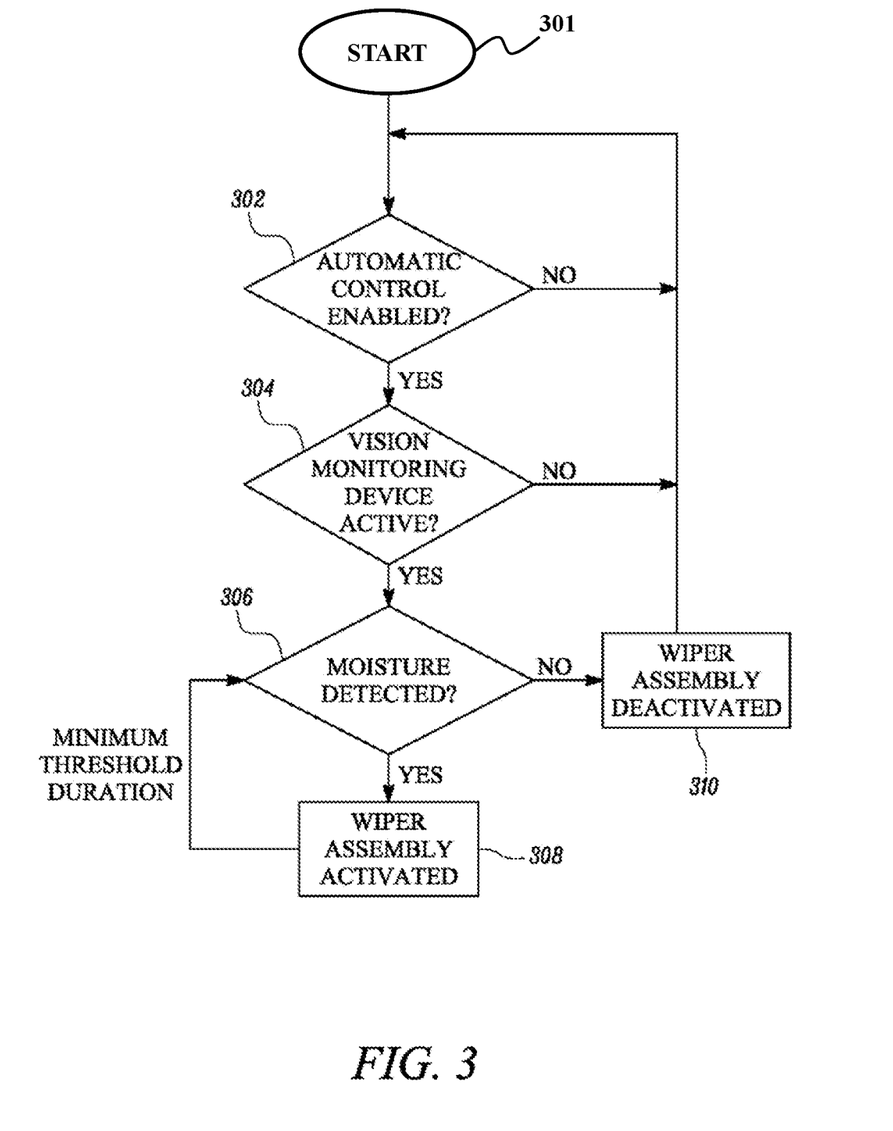
FIG. 3 is a flowchart for a control of a wiper assembly of the visibility control system, according to an embodiment of the present disclosure.
Figure 4:
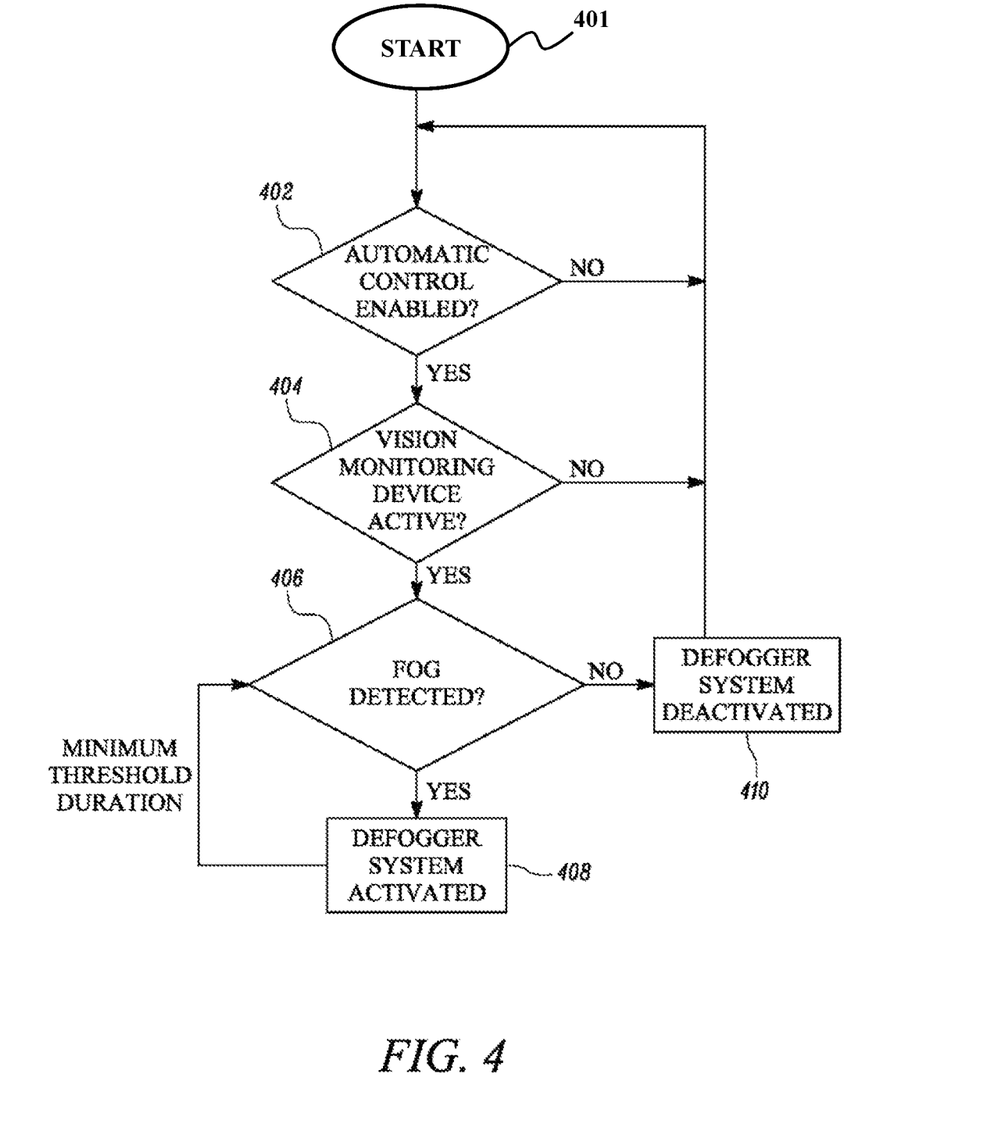
FIG. 4 is a flowchart for a control of a defogger system of the visibility control system, according to an embodiment of the present disclosure.
Figure 5:
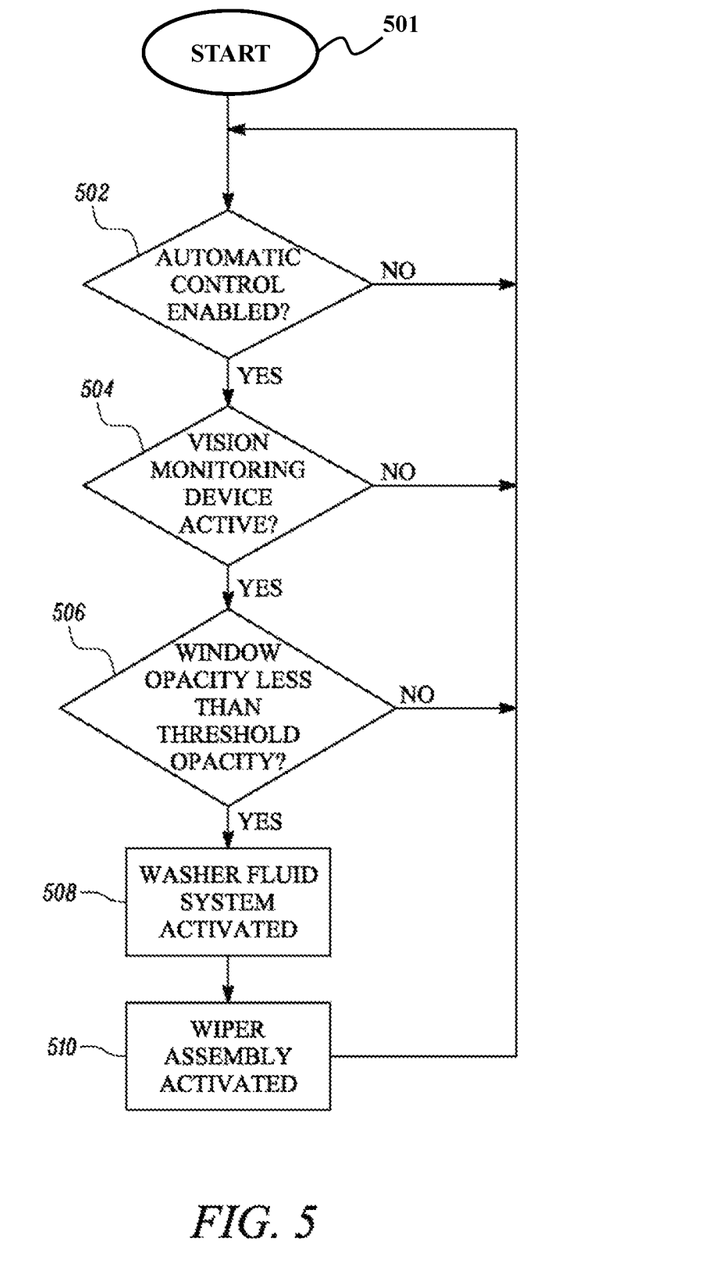
FIG. 5 is a flowchart for control of a washer fluid system of the visibility control system, according to an embodiment of the present disclosure.

The controller 202 may be configured to determine if the monitoring device 102 is switched on or active. The controller 202 is configured to receive a signal indicative of at least one of the parameters related to the glass surface 104 from the sensing module 112. The parameters may include a presence of moisture, a presence of fog, opacity and the like. Further, the controller 202 is configured to control an operation by the cleaning system 114 based on the received signal. Referring to FIGS. 3 to 5, a control process for controlling various components of the cleaning system 114 is illustrated.

Referring now to FIG. 3, a flowchart for a control of the wiper assembly 106 by the controller 202 is illustrated. The method starts at step 301 and moves to step 302. At step 302, the controller 202 may determine if the automatic control mode is enabled. The controller 202 may pass the control to step 304 if the automatic control mode is enabled. At step 304, the controller 202 may determine if the visibility monitoring device 102 is activated. The controller 202 may pass the control to step 306 if the monitoring device 102 is enabled. At step 306, the controller 202 may determine if the moisture is present on the glass surface 104. In an embodiment, the controller 202 may determine the presence of the moisture based on the signal received via the moisture sensing device 110. If at step 306, the controller 202 determines the presence of the moisture on the glass surface 104, the controller 202 may pass the control to step 308. At step 308, the controller 202 may activate the wiper assembly 106 for a predetermined duration. Thereafter, the controller 202 may return the control to step 306 from step 308. As such, the controller 202 may activate the wiper assembly 106 until the controller 202 determines there is no substantial moisture on the glass surface 104.

However if at step 306, the controller 202 determines that there is no substantial moisture on the glass surface 104, the controller 202 may pass the control to step 310. At step 310, the controller 202 may deactivate the wiper assembly 106.

Referring to FIG. 4, a flowchart for a control of the defogger system 130 by the controller 202 is illustrated. The method starts at step 401 and moves to step 402. At step 402, the controller 202 may determine if the automatic control is enabled. The controller 202 may pass the control to step 404 if the automatic control is enabled. At step 404, the controller 202 may determine if the monitoring device 102 is activated. The controller 202 may pass the control to step 406 if the monitoring device 102 is enabled. At step 406, the controller 202 may determine if the fog is present on the interior glass surface 104. In an embodiment, the controller 202 may determine the presence of the fog based on the signal received via the moisture sensing device 110. In another embodiment, the controller 202 may determine the presence of fog based on an opacity of the glass surface 104. In such a case, the controller 202 may determine the opacity based on the signal received via the photo sensor 120. Further, the controller 202 may determine that the fog is present on the glass surface 104 if the opacity is less than a minimum threshold opacity.

If at step 406 the controller 202 determines the presence of the fog on the glass surface 104, the controller 202 may pass the control to step 408. At step 408, the controller 202 may activate the defogger system 130 for a predefined duration. Thereafter, the controller 202 may return the control to step 406 from step 408. As such, the controller 202 may activate the defogger system 130 until the controller 202 determines there is no substantial fog on the glass surface 104.

However if at step 406, the controller 202 determines that there is no substantial fog on the glass surface 104, the controller 202 may pass the control to step 410. At step 410, the controller 202 may deactivate the defogger system 130.

Referring to FIG. 5, a flowchart for a control of the washer fluid system 140 by the controller 202 is illustrated. The method starts at step 501 and moves to step 502. At step 502, the controller 202 may determine if the automatic control is enabled. The controller 202 may pass the control to step 504 if the automatic control is enabled. At step 504, the controller 202 may determine if the monitoring device 102 is activated. The controller 202 may pass the control to step 506 if the monitoring device 102 is enabled. At step 506, the controller 202 may determine if the opacity of the glass surface 104 is less than a second minimum threshold. In an embodiment, the controller 202 may determine the opacity via the photo sensor 120. If at step 506 the controller 202 determines the opacity of the glass surface 104 is less than the second minimum threshold, the controller 202 may pass the control to step 508. At step 508, the controller 202 may activate the washer fluid system 140. The washer fluid system 140 is configured to apply the washer fluid to the glass surface 104 upon activation. Further, the controller 202 may pass the control to step 510. At step 510, the controller 202 may activate the wiper assembly 106. As such, the wiper assembly 106 may remove the wiper fluid on the glass surface 104.

Figure 6:
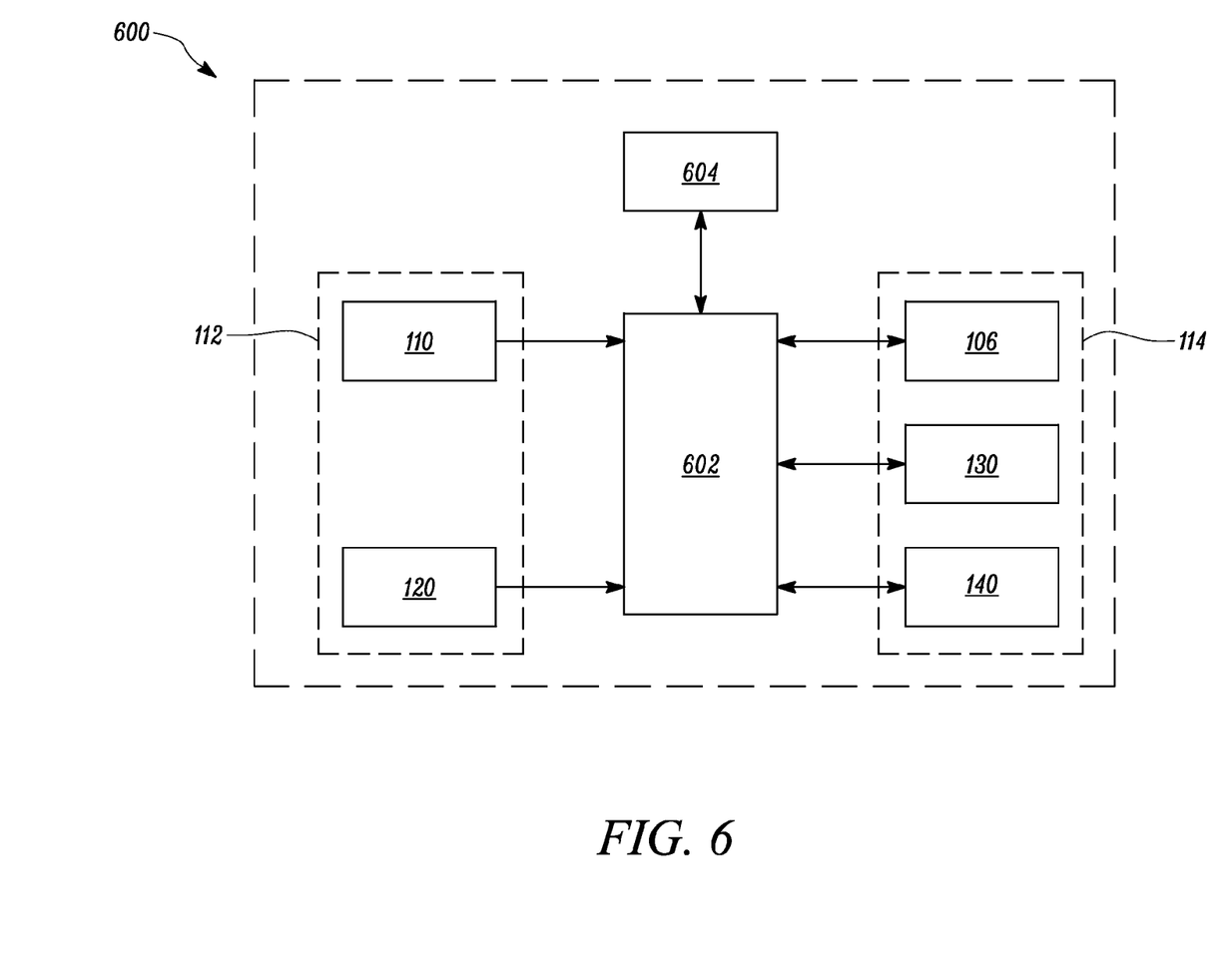
FIG. 6 is a block diagram of a visibility control system for the glass surface of the cabin, according to another embodiment of the present disclosure.

Referring to FIG. 6, a visibility control system 600 associated with the locomotive 100, according to another embodiment of the present disclosure is illustrated. The visibility control system 600 includes the sensing module 112 and the cleaning system 114 as described above. The visibility control system 600 also includes a user input interface 604. In an example, the user input interface 604 may be disposed external to the locomotive 100. The user input interface 604 may include various operator controls, along with displays or indicators and one or more input devices that are used to drive the cleaning system 114 and convey information to an operator.

The visibility control system 600 also includes a controller 602 communicably coupled to the sensing module 112, the cleaning system 114 and the user input interface 604. The controller 602 is substantially similar to the controller 202 that is described herein. As described above, the controller 602 is configured to receive, via the sensing module 112, the signal indicative of the parameters related to the glass surface 104. However, the controller 602 is also configured to receive, via the user input interface 604, a user input corresponding to controlling the cleaning operation by the cleaning system 114. Further, the controller 602 is also configured to communicate with the cleaning system 114 to control the cleaning operation based on at least one of the received signal and the user input.

In an embodiment, the locomotive 100 may include one or more input devices (not shown) configured to allow a user to provide instruction corresponding to enabling one of a remote control and the automatic control. As such, upon enabling the automatic control, the controller 602 may operate similar to the controller 202, according to various embodiments described herein with reference to FIG. 2 to FIG. 5. However, if the remote control is enabled, the controller 202 may operate based on the user input as will be described hereinafter.

Figure 7:
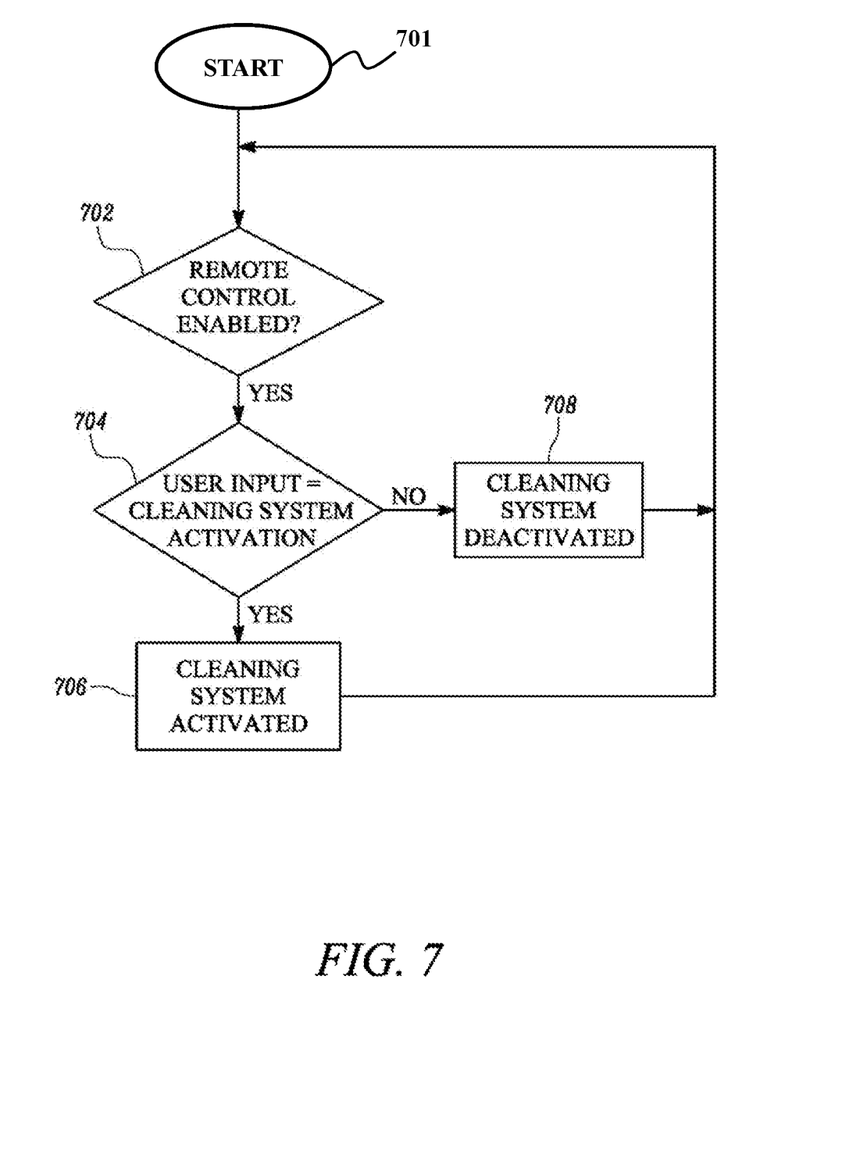
FIG. 7 is a flowchart for a control of a cleaning system of the visibility control system of FIG. 6, according to an embodiment of the present disclosure.

Referring to FIG. 7, a flowchart for a control of the cleaning system 114 by the controller 602, according to an embodiment of the present disclosure is illustrated. The method starts at step 701 and moves to step 702. At step 702, the controller 602 determines if the remote control is enabled. If at step 702, the controller 602 determines that the remote control is enabled, the controller 602 passes the control to step 704. At step 704, the controller 602 receives, via the user input interface 604, the user input corresponding to activating the cleaning system 114. In one embodiment, the user input may correspond to activating the wiper assembly 106. In another embodiment, the user input may correspond to activating the defogger system 130. In yet another embodiment, the user input may correspond to activating the washer fluid system 140. In various other embodiments, the controller 202 may receive the user input corresponding to activating or controlling other components of the cleaning system 114.

In an embodiment, the visibility control system 600 may include a display device (not shown) communicably coupled to the sensing module 112. The display device may display various outputs indicative of the parameters related to the glass surface 104. As such, an operator may provide, via the user input interface 604, the suitable user input corresponding activation of the components of the cleaning system 114. In an example, the operator may choose to activate the wiper assembly 106 upon determining the presence of moisture on the glass surface 104.

At step 706, the controller 602 may activate the cleaning system 114 based on the received user input. However, if at step 704, the user input corresponds to deactivating the cleaning system 114, the controller 202 may pass the control to step 708. At step 708, the controller 202 may deactivate the cleaning system 114.

INDUSTRIAL APPLICABILITY

Typically, machines such as, locomotives include windshields on a cabin structure of the cabin. The windshields may provide visibility of surroundings to an operator or other monitoring devices such as, a camera. However, due to certain environment conditions or during operation of the locomotive, moisture, fog or other dust particles may be present on the windshields thereby obstructing visibility therethrough. The present disclosure relates to systems and methods for determining these parameters of the glass surface and accordingly performing the cleaning operation on the glass surface.

Figure 8:
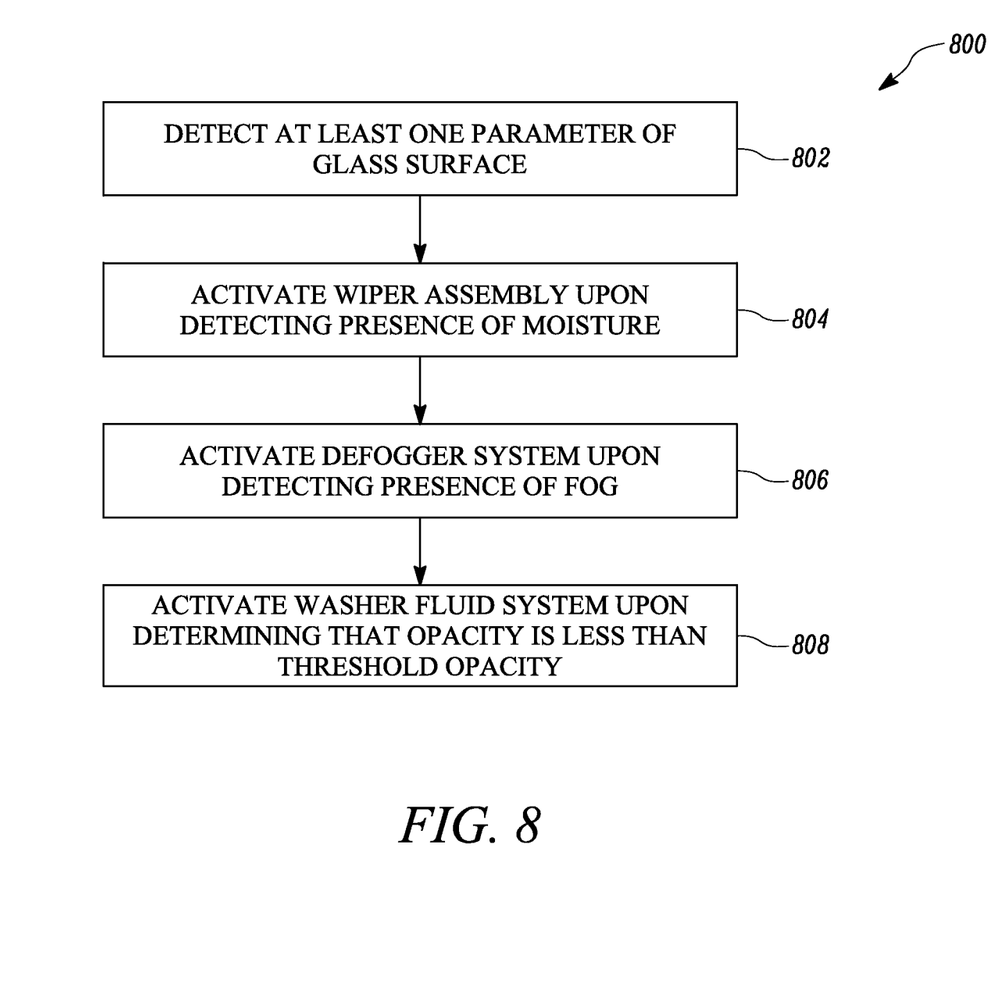
FIG. 8 is flowchart for a method of controlling visibility through the glass surface, according to an embodiment of the present disclosure.

A method 800 of controlling visibility through a glass surface of a locomotive will now be described. Referring to FIG. 8, a flowchart of the method 800 is illustrated. The method 800 will be explained with reference to the glass surface 104 of FIG. 1, but may be utilized to other types of glass surfaces associated with various other machines known in the art. In one embodiment, the method 800 may be implemented using the visibility control system 200. In another embodiment, the method 800 may be implemented using the visibility control system 600.

At step 802, the method 800 includes detecting at least one parameter of the glass surface 104. The parameters may include the opacity of the glass surface 104, the presence of moisture on the glass surface 104 and the presence of fog on the glass surface 104. The sensing module 112 may be configured to detect the parameters of the glass surface 104.

At step 804, the method 800 includes activating the wiper assembly 106 upon detecting the presence of the moisture. The wiper assembly 106 is configured to at least partly remove the moisture from the glass surface 104. The controller 202, 602 may be configured to activate the wiper assembly 106 upon receiving the signal indicative of the presence of the moisture.

At step 806, the method 800 includes activating the defogger system 130 upon detecting the presence of fog. The defogger system 130 is configured to at least partly remove the fog from the glass surface 104. The controller 202, 602 may be configured to activate the defogger system 130 upon receiving the signal indicative of the presence of the moisture. At step 808, the method 800 includes activating the washer fluid system 140 upon determining the opacity is less than a threshold opacity. The washer fluid system 140 is configured to apply a washer fluid to the glass surface 104. The controller 202, 602 may be configured to activate the washer fluid system 140 upon receiving the signal indicative of the opacity less than a threshold opacity.

Additionally or optionally, the method 800 also includes receiving, via the user input interface 604, the user input corresponding to activating the wiper assembly 106, the defogger system 130 and the washer fluid system 140. The method 800 may further include activating the corresponding wiper assembly 106, the defogger system 130 and the washer fluid system 140 based on the user input.

The present disclosure also relates to the visibility control system 200. The controller 202 is configured to automatically activate the respective components of the cleaning system 114 based on the parameters of the glass surface 104. As such, the cleaning operation by the cleaning system 114 may be accurately performed at a required time. The present disclosure also relates to the visibility control system 600. The controller 602 is configured to remotely activate the respective components of the cleaning system 114 based on the user input. As such, the cleaning operation by the cleaning system 114 may be controlled by an operator based as needed. Such a system 600 enables the operator to easily control the cleaning operation from a remote location. Additionally, in other applications, the controller 602 may be configured to automatically activate the cleaning system 114 by changing the mode to automatic mode.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A visibility control system for controlling a visibility from the inside of a locomotive to the outside through a glass surface of the locomotive, the visibility control system comprising:
   a sensing module for detecting and generating a parameter signal indicative of at least one parameter related to the glass surface, the sensing module comprising:
      a moisture sensing device configured to detect a presence of moisture on the glass surface; and
      a photo sensor configured to detect an opacity of the glass surface;
   a cleaning system configured to perform a cleaning operation on the glass surface;

a user interface located remotely from the locomotive and comprising a user input configured to allow a user to enter an activate cleaning system signal, and a display configured to display the at least one parameter related to the glass surface in response to the parameter signal; and a controller communicably coupled to the sensing module, the cleaning system, and the user interface the controller configured to:
receive the parameter signal from the sensing module;
send the parameter signal to the user interface;
receive the activate cleaning signal from the user interface; and
in response to the activate cleaning signal, communicate with the cleaning system to control the cleaning operation based on the received activate cleaning system signal.

2. The visibility control system of claim 1, wherein the cleaning system comprises at least one of:
a wiper assembly configured to at least partly remove the moisture on the glass surface;
a defogger system configured to at least partly remove the fog on the glass surface; and
a washer fluid system configured to apply a washer fluid to the glass surface.

3. The visibility control system of claim 2, wherein the activate cleaning signal includes an activate wiper assembly signal, and the controller is configured to activate the wiper assembly upon receiving, the activate wiper assembly signal from the user interface.

4. The visibility control system of claim 2, wherein the activate cleaning signal includes an activate defogger system signal, and the controller is configured to activate the defogger system upon receiving the activate defogger system signal from the user interface.

5. The visibility control system of claim 2, wherein the activate cleaning signal includes an activate washer fluid system signal, and the controller is configured to activate the washer fluid system upon receiving the activate washer fluid system signal from the user interface.

6. The visibility control system of claim 1, wherein the locomotive is an unattended locomotive.

7. The visibility control system of claim 1, wherein the glass surface is a windshield of the locomotive.

8. The visibility control system of claim 1, wherein:
the user input is configured to allow a user to enter a deactivate cleaning system signal; and
the controller is configured to communicate with the cleaning system to deactivate the cleaning operation based on the received deactivate cleaning system signal.

9. A method of controlling a visibility of a glass surface of a locomotive, the method comprising:
detecting at least one parameter of the glass surface, the at least one parameter comprising at least one of an opacity of the glass surface, a presence of moisture on the glass surface and a presence of fog on the glass surface;
generating a parameter signal indicative of the at least one parameter of the glass surface;
receiving the parameter signal with a user interface remote from the locomotive;
displaying the at least one parameter of the glass surface on a display of the user interface;
generating an activate cleaning system signal with the user interface in response to a user input to the user interface
receiving the activate cleaning system signal with the controller; and
controlling a cleaning operation of a cleaning system of the locomotive with the controller based on the received activate cleaning system signal to clean the glass surface.

10. The method of claim 9, wherein the locomotive is an unattended locomotive.

11. The method of claim 9, wherein the glass surface is a windshield of the locomotive.

12. The method of controlling visibility of claim 9, wherein controlling a cleaning operation of a cleaning system of the locomotive with the controller based on the received activate cleaning system signal to clean the glass surface includes activating a wiper assembly.

13. The method of controlling visibility of claim 9, wherein controlling a cleaning operation of a cleaning system of the locomotive with the controller based on the received activate cleaning system signal to clean the glass surface includes activating a defogger system.

14. The method of controlling visibility of claim 9, wherein controlling a cleaning operation of a cleaning system of the locomotive with the controller based on the received activate cleaning system signal to clean the glass surface includes activating a washer fluid system.

* * * * *